United States Patent
Nagy et al.

(10) Patent No.: US 7,967,030 B2
(45) Date of Patent: Jun. 28, 2011

(54) SPLICED LONG-LENGTH HOSE AND METHOD FOR SPLICING HOSES

(75) Inventors: Tibor Nagy, Budapest (HU); Tamas Katona, Algyo (HU); Imre Domonkos, Szeged (HU); Laszio Nacsa, Algyo (HU); Peter Gorgenyi, Budapest (HU); Elemer Lantos, Budapest (HU)

(73) Assignee: Phoenix Rubber Gumiipari Kft., Szeged (HU)

(*) Notice: Subject to any disclaimer, the term of this patent is extended or adjusted under 35 U.S.C. 154(b) by 978 days.

(21) Appl. No.: 11/843,885

(22) Filed: Aug. 23, 2007

(65) Prior Publication Data

US 2008/0047625 A1 Feb. 28, 2008

(30) Foreign Application Priority Data

Aug. 24, 2006 (HU) .................................. 21558/06

(51) Int. Cl.
*F16L 11/00* (2006.01)
(52) U.S. Cl. ........ 138/109; 138/155; 138/120; 138/125; 285/222.2; 285/222.4
(58) Field of Classification Search .................. 138/109, 138/125, 127, 134, 136, 120, 155; 285/222.2, 285/22.1, 286.1
See application file for complete search history.

(56) References Cited

U.S. PATENT DOCUMENTS

| | | | | |
|---|---|---|---|---|
| 3,667,112 A | * | 6/1972 | Chevalier et al. | 29/508 |
| 3,731,710 A | * | 5/1973 | Bauer et al. | 138/143 |
| 3,965,555 A | * | 6/1976 | Webster et al. | 29/890.14 |
| 4,310,184 A | * | 1/1982 | Campbell | 285/238 |
| 4,323,089 A | * | 4/1982 | Kadono et al. | 138/109 |
| 4,860,798 A | | 8/1989 | Kovacs et al. | 138/133 |
| 5,288,109 A | * | 2/1994 | Auberon et al. | 285/222.4 |
| 6,273,142 B1 | * | 8/2001 | Braad | 138/109 |
| 6,315,002 B1 | * | 11/2001 | Antal et al. | 138/109 |
| 6,874,542 B2 | * | 4/2005 | Mayau et al. | 138/109 |
| 6,938,932 B2 | | 9/2005 | Grepaly et al. | 285/222.2 |

FOREIGN PATENT DOCUMENTS

| | | |
|---|---|---|
| HU | 166 837 | 12/1975 |
| HU | 176 336 | 7/1980 |
| HU | 198 781 A | 11/1989 |
| HU | 218 344 B | 3/1999 |
| HU | 224 141 B1 | 12/2002 |

OTHER PUBLICATIONS

International Patent Application No. WO 02/42672 in the name of Eccleston, et al.
Specification for Bonded Flexible Pipe, ANSI/API Specification 17K, 2nd Edition, Sep. 2005.
Surface Vehicle Standard, SAE J517, Issued Jan. 1952; Revised Jun. 1995.
Specification for Unbonded Flexible Pipe, API Specification 17J, 2nd Edition, Nov. 1999; Effective Date, Jul. 1, 2000.

* cited by examiner

*Primary Examiner* — Patrick F Brinson
(74) *Attorney, Agent, or Firm* — Duane Morris LLP

(57) ABSTRACT

A long-length hose spliced from two or more hoses containing an inner sealing layer, at least two spirally laid reinforcing plies, and a cover. A liner forming the inner sealing layer is formed by leak-tight splicing of liners of hoses to be spliced and the reinforcing plies are embedded into filling/adhesive material inside of a rigid outer sleeve, at the location of the splicing.

9 Claims, 4 Drawing Sheets

SPLICED LONG-LENGTH HOSE AND METHOD FOR SPLICING HOSES

RELATED APPLICATIONS

This application claims foreign priority benefits under 35 U.S.C. 119 of Hungarian Patent Application No. P 06 00676, filed on Aug. 24, 2006 in Hungary, the entire disclosure of which is incorporated herein by reference.

FIELD OF THE INVENTION

The invention relates to spliced long-length hose-line and method for splicing the hoses forming it. The long-length hose-line according to this invention is spliced from two or more hoses and contains at least two reinforcing plies. Further, the term "long-length" used in the Description and Claims of the present invention typically means that the length of the hose exceeds the hundredfold of its internal diameter. The splicing method of the hose-pieces is also within the scope of the invention.

BACKGROUND OF THE INVENTION

It is known that high-pressure hoses containing various metal reinforcing plies are widely used by the industry in different fields. These hoses are usually characterized by a polymer-based, flexible innermost layer, the so called liner, functioning as a sealing, fluid-retaining isolating layer between the fluid transported in the hose and the other layers of the hose. As for the material of the liner, it can be made of thermoplastic or cross-linked plastic, most frequently, however, of vulcanized rubber.

As it is well-known high-pressure hoses contain reinforcing plies as load bearing elements. These also can be made of various materials and be of various designs. According to the design of the reinforcing plies there are hoses in which the reinforcing plies are formed by braided steel wires of circular cross section. Such hoses are described for instance in the Standard SAE J 517.

In other hoses the reinforcing plies are made of helically wound steel wires or cables; such hoses are the ones according to API Specification 17K elaborated by American Petroleum Institute (API) and the corresponding ISO 13628-10 which are bonded (rubber) hoses, or the reinforced flexible hoses, according to Hungarian Patent No. 198 781 (corresponding to No. U.S. Pat. No. 4,860,798). The latter relates to flexible hoses reinforced by wire plies, wherein the wires are laid spirally, at least in two layers, and the hoses may contain rings which are more rigid than the fibres or a low-pitch helix, as well.

In yet other hoses the reinforcing plies can be steel profiles and spirally wound flat steel tendons; such designs are known for instance from API Specification 17J related to requirements for unbonded (plastic based) hoses.

For providing protection against different impacts high-pressure hoses generally contain an elastic outer layer, the so called cover, further they can comprise a number of other elements, such as an inner flexible stripwound, an outer armouring, a rigid helix, steel rings, layers providing flame-resistance etc. All these elements and possibilities including the requirements of special application areas are well-known to those skilled in the art.

According to prior art the flexible high-pressure hoses are connected to each other or to rigid pipelines by metal couplings. The critical point of the hose-lines is the connection between the flexible hose and the rigid coupling, which has to provide sealing between the elastic liner and the rigid coupling, besides of the mechanical bond. Several designs are known for the coupling. For instance according to the designs described in the Hungarian Patent Nos. 168 837, 218 344, and 224 141 and corresponding U.S. Pat. No. 6,938,932 the metal coupling is bonded to the reinforcing plies by adhesive resin and the sealing between the rubber and the coupling is formed by metal-to-rubber bond. In unbonded hoses too the coupling is fixed by adhesive bonding, but the sealing is produced mechanically. Examples are found in the Standard API RP 17B.

According to another, well-known fixing way in practice the metal coupling is fixed to the hose-end by swaging as it can be known for instance from the International Patent Application WO 0242672 and the Hungarian Patent No. 176 336.

When hoses are connected to each other, the common disadvantage of the above referred designs is that at least three potential leakage paths can be formed in the coupled hose-lines; namely between the two couplings connected to each other, and between the corresponding metal couplings and the elastic liner. The number of these potential leakage places is multiplied by the number of the coupled hose-pieces (corresponding to the number of the connections). The actual situation is often worse than this, because usually the coupling device itself consists of two or more parts and leakage can be developed between these parts too.

The above detailed disadvantages can explain the reluctance of the users to couple hoses into lines or the fact for example that laying of such lines is often not allowed in the case of high-pressure submarine lines for reasons of environment protection.

Another considerable disadvantage is that at the location of the connection a relatively long, rigid section is formed, the dimension of which corresponds to that of the two couplings, and during the use this makes difficult or impossible to wind the hoses to a reel of reasonable size.

SUMMARY

The object of the invention is therefore to eliminate the above disadvantages by coupling the hose-pieces so that, according to the recognition of the invention, the liner remains continuous, thus there is no potential leakage path and the length of the built-in rigid section is minimal, the bond is still complete without reducing the pressure bearing capacity of the hose-line. At the same time the design according to the invention does not require complicated, expensive bonding elements and can be produced in a simple way. The design according to the invention can be used also for vulcanized rubber hoses, hoses with thermoplastic or cross-linked plastic liner, and unbonded plastic hoses containing reinforcing plies.

Consequently the invention relates to long-length hose-line produced by splicing two or more hoses containing an inner sealing liner, at least two spirally laid reinforcing plies, and a cover, characterized by that the liner forming the inner sealing layer is spliced forming a leak-tight bond and the reinforcing plies of the hose are embedded into filling/adhesive material inside of a rigid outer sleeve at the location of the splicing.

In the long-length hose according to the invention preferably at least one of the reinforcing plies of each spliced hose are overlapped within the rigid outer sleeve.

Further, when using two reinforcing plies it is preferred if the reinforcing ply laid in higher angle is overlapped and when there are more than two plies, the overlapping of reinforcing plies laid in the highest angle is preferred. (The angle is measured from the circular cross-section perpendicular to the hose-axis, i.e., the component of the force in direction of the hose axis is bigger in the ply of higher angle in the case of equal force distribution).

According to a preferred embodiment of the invention the hose comprises a rigid inner sleeve under the spliced liner.

Preferably at least one reinforcing ply of the hose according to the invention on either side of the splicing are supported by elements flaring conically towards the splicing place, preferably by spiral cones and its rigid outer sleeve is flaring conically from either side to the central point.

The invention covers also the method for manufacturing the spliced hose. The method essentially includes pulling a rigid outer sleeve onto one end of one of the hoses to be spliced; folding back at least one of the reinforcing plies of either hose-end to be spliced, splicing (i.e. bonding leak-tightly) the liners of the two hose-ends, laying the back-folded reinforcing plies back in their original position; moving the rigid outer sleeve to the place of splicing; and filling the free space below with filling/adhesive material. Expediently at least one of the plies of either hoses to be spliced are overlapped when laying them back.

Splicing (leak-tight bonding) of the liner is preferably implemented by vulcanization; optionally the bond can be created by adhesive bond or welding.

In another preferred embodiment of the method according to the invention the hoses to be spliced are vulcanized on hose mandrel; one of the hoses is removed from its mandrel; and its end to be spliced is pulled onto the mandrel of the other hose.

According to another embodiment of the method an inner sleeve is built in at the place of splicing; and the splicing is carried out without hose mandrel.

In another preferred embodiment of the method according to the invention an element flaring conically towards the hose-end is placed under at least one of the reinforcing plies during manufacturing. It is also preferred, if the reinforcing plies at the hose-ends are protected by a separation layer (strip) from the embedding rubber during manufacture of the hoses to be spliced.

In yet another embodiment of the method according to the invention hoses containing inner flexible metal stripwound are spliced. In this case splicing can be made without hose mandrel. This is particularly preferable in the case of flexible production lines in remote oilfields without adequate infrastructure, because the delivery of hose sections to be spliced in short pieces is relatively cheap, and long, continuous lines can be formed from them for riser or flow line applications.

Splicing can also be made in the case of hoses comprising spiral metal or composite reinforcing plies and having a plastic liner.

The invention will be described and illustrated in greater detail by means of the following drawings and examples. It should be noted that the hose containing more reinforcing plies than the number of reinforcing plies of the hoses illustrated by means of the drawings and examples can be formed by a specialist after training and can be produced without inventor's activity, therefore hoses containing more reinforcing plies also fall within the protective scope of the invention.

DETAILED DESCRIPTION OF THE INVENTION

By means of FIG. 1 first the principle of the invention (product and method) will be described, followed by the detailed description of the drawings.

Figure 1:
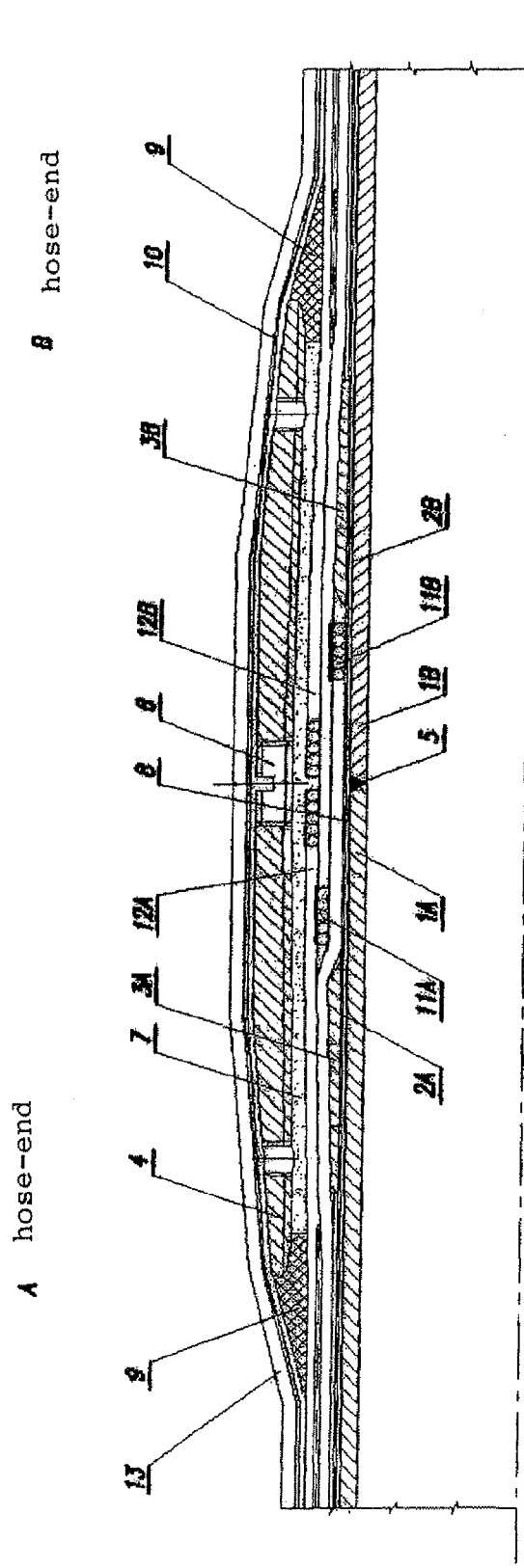
FIG. 1 is a sectional view of the hose according to the invention.

Distinction is made between hose-end A and hose-end B shown in FIG. 1.

In the spliced high-pressure hose according to the invention liner 1 is made by splicing the liners 1A and 1B of the two hoses for instance by welding, adhesive bond, or vulcanization. The load-distributing rubberized textiles 2A, 2B are joined at the place of splicing by overlapping rubberized textile 8, reinforcing plies 11A, 11B, 12A, and 12B above the rubberized textiles are embedded in resin 7. One or more reinforcing plies of the hose-ends A and B are arranged overlapping each other. Reinforcing plies are surrounded by a rigid outer sleeve 4 which is bonded to reinforcing plies by resin 7. Resin 7 gets into the hose structure through an inlet. The inlet is closed by a resin inlet closing screw 6. The rigid outer sleeve 4 can be made of metal, fibre-reinforced plastic, or other structural materials having adequate mechanical strength. According to a preferred embodiment of the invention the inner envelope of the rigid outer sleeve 4 is flaring conically towards the central point and has a circular or helically slotted surface for the better fixing of resin 7. At the same time spiral cone supports 3A, 3B formed conically towards the central point are arranged in hose-ends A and B under the reinforcing plies. Said spiral cone 3 is expediently slashed helically. Filling rubber 9 is placed between the conical rigid outer sleeve 4 and reinforcing plies 12A, 12B.

The main steps of the method for manufacturing the spliced long-length hose according to the invention are as follows.

A rigid outer sleeve 4 is pulled onto one of the hose-ends A and B to be spliced, then at least one of the reinforcing plies 11A, 11B of either hoses to be spliced is folded back. The liners 1 (liquid sealing layer) of the two hoses are leak-tightly spliced by one of the above mentioned bonding methods; the back-folded reinforcing plies 11A, 11B are laid back in their original direction; the rigid outer sleeve 4 is pulled to the location of the splicing; and the free space below is filled with resin 7.

In the case of rubber hoses manufactured on rigid mandrel the main steps of the method are as follows.

When building the hoses, the two hose-ends A and B to be spliced are already formed so that splicing can be made easily and quickly.

Figure 2:
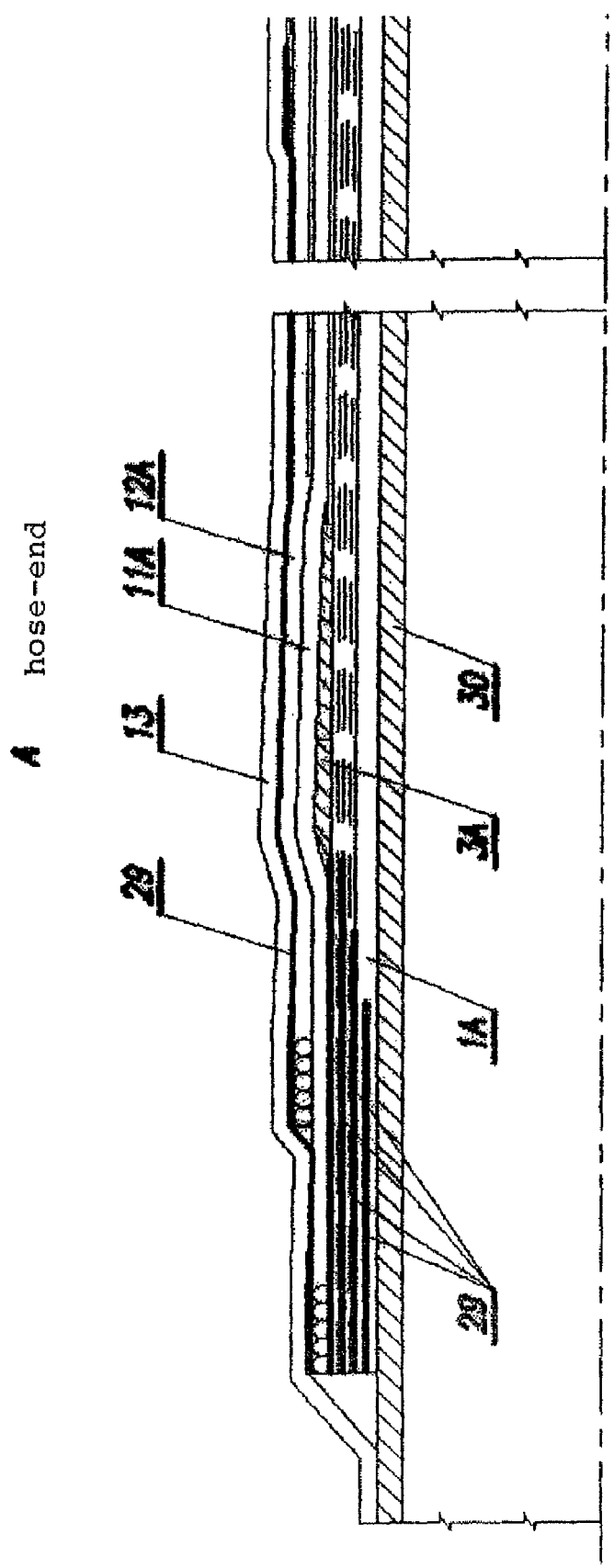
FIG. 2 is also a sectional view of the hose-ends to be spliced.

A hose-end A prepared for splicing in the phase of manufacturing is shown in FIG. 2. The conditions required for splicing, for instance the steps required for vulcanized bonding with overlapping, are created already during the building of the liner ends 1A and 1B and are protected by a separation strip 29. Supports 3A and 3B are already placed before laying the reinforcing plies. Before vulcanization reinforcing plies 11A, 11B, 12A, and 12B are cut to a length adequate to splicing and are protected with separation strips 29 during building the hose ends, in order to prevent adhesion between the embedding rubber and reinforcement at the place of splicing. The separation strip 29 can be made for instance of polyamide fabric or paper impregnated with separating material or other strip which does not adhere to the actual rubber compound. Reinforcing plies are covered by cover rubber 13, then the hose is vulcanized on hose mandrel 30. As spiral cone support 3 is already placed, and reinforcing plies are protected against adhesion into the embedding rubber during manufacturing the hoses to be spliced, thus the operation time required for splicing is decreased significantly. Additionally cleaning of the reinforcing plies from vulcanized rubber is not necessary. This would be a very time-consuming procedure, pollutes the environment and weakens the bond with filling/adhesive material because of the remaining tiny rubber parts.

For splicing the cover rubber 13 is removed from one of the hoses (hose-end A) in the section to be spliced and the conical rigid outer sleeve 4 is pulled onto it. The other hose (hose-end B) is pulled from the mandrel 30 and its end is pulled onto the end of the mandrel of hose A. Reinforcing plies 11A, 11B, 12A, 12B are folded back after removing the cover rubber 13, and the separation strip 29 and leak-tight splicing of the exposed liner-ends 11A, 11B is carried out for instance by uncured rubber compound 5, bonding the liner-ends by overlapping. If there is load-distributing rubberized textile 2 above the liner, then it is also spliced with uncured-rubberized textile 8, then vulcanized by electrical heating. Thereafter reinforcing plies 11A, 11B are overlapped with each other and plies 12A, 12B being butt-jointed and overlapping with reinforcing plies 11A, 11B are folded back into their original direction. The rigid outer sleeve 4 is moved onto the spliced section and its ends are closed with filling green rubber 9. The space between reinforcing plies is filled through the middle inlet of the conical rigid outer sleeve 4 with filling/adhesive material, particularly resin 7, for instance epoxy resin, then the resin inlet is closed by the resin inlet closing screw 6. In a preferred embodiment cover fabric 10 and cover rubber 13 are applied above the conical rigid outer sleeve 4 which will be vulcanized. Finally the spliced hose is pulled from the hose mandrel.

The splicing can be designed so that neither of the hoses is on the mandrel when implementing the splicing but a relatively rigid inner sleeve is placed under the liner at least in some part of the area to be spliced, thus the splicing can be fulfilled either in the field or on a ship, on a platform.

Example 1 explained in greater details below, is associated to the drawings above.

EXAMPLE 1

Two rubber hoses with an inner diameter of 76 mm were built up. The hose liner 1 (liquid sealing layer) was made of rubber compound containing NBR. Load-distributing rubberized textile layers 2 were arranged above the liner. The hoses contained two reinforcing plies (cables) 11 and 12. A 70 mm long spiral cone 3 having a wall thickness increasing gradually from the direction of the hose-body up to 3.6 mm is built in under said reinforcing plies at the location of the splicing. The hoses were vulcanized on hose mandrel. The conical rigid outer sleeve 4, made of steel in this case, with an inner diameter flaring in an angle of 1° to the central point and with an inner surface formed circularly corrugated was pulled onto hose A. The splicing was carried out on hose mandrel, liner-ends 1A, 1B, were spliced with uncured rubber compound 5, and load-distributing rubberized textiles 2A, 2B were joined by using unvulcanized load-distributing textile 8 after folding back the reinforcing plies 11, 12, then this section was vulcanized by electrical heating. Reinforcing ply (lower cable ply) 11A of hose A was folded on the spliced vulcanized load-distributing rubberized textile 2 and was fixed there by binding, then the lower reinforcing ply 11B of hose B was laid on it. Reinforcing plies 11A and 11B of the two hoses were overlapped each other at a length of 100 mm after lying. Reinforcing plies (upper cable plies) 12A and 12B of hoses A and B were folded back and after laying-back were butt-jointed with small gap without overlapping. The conical rigid outer sleeve 4 was moved to its final place and fixed at its ends with filling rubber 9. The space between reinforcing plies was filled with filling/adhesive material, resin (epoxy resin) 7, rubberized textile 10 reinforcing the cover was applied after inserting the resin inlet closing screw 6, then cover rubber 13 was also applied. While vulcanizing the cover rubber 13, the epoxy resin crosslinked to its final network density.

The complete spliced hose was exposed to a pressure test of 700 bar, then the pressure was increased till failure of the hose. Failure took place at a pressure of 836 bar at the end of the hose opposite to the splicing by cable breakage. The spliced section was cut lengthwise and it was found that cables were not damaged in this section.

EXAMPLE 2

Figure 3:
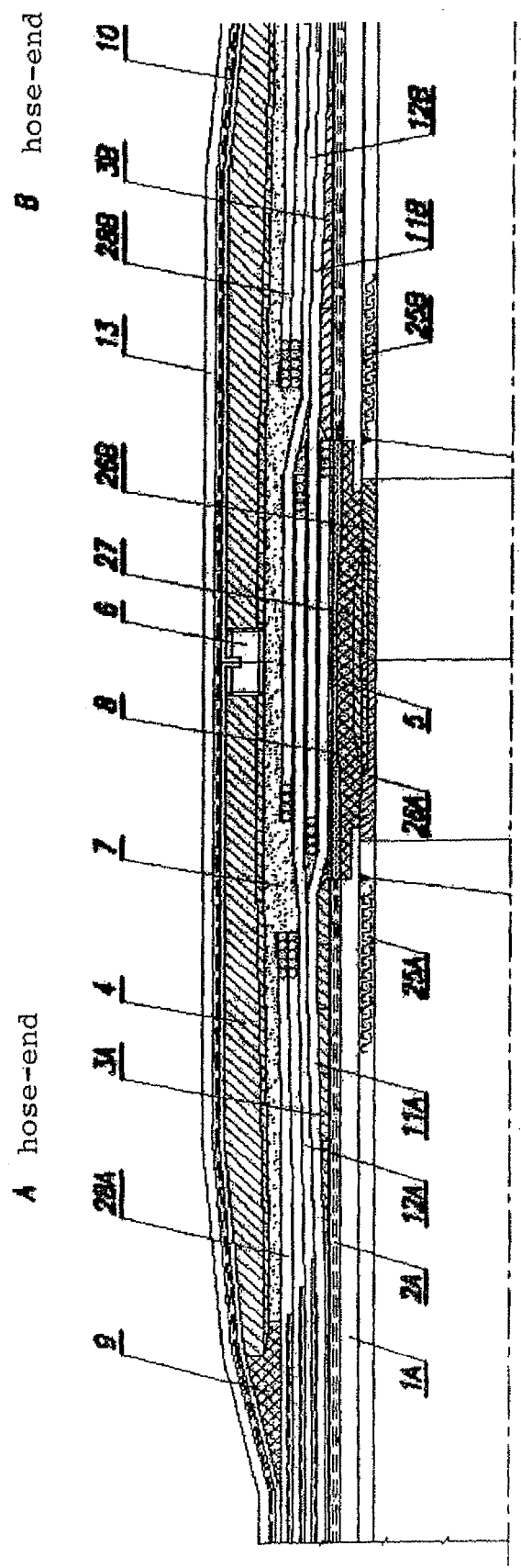
FIG. 3 is a sectional view of a hose with an inner flexible stripwound and multiple cable piles.

Bonded rubber hoses with four cable plies were spliced. The spliced section is shown in FIG. 3. The hoses had an inner diameter of 103.5 mm. The innermost layer of the hoses was an inner flexible stripwound 25 of stainless steel ending in a threaded sleeve 26. At the end of hose A there was a right-hand thread, at the end of hose B there was a left-hand thread. The hoses contained liquid sealing layer, liner 1, made of rubber compound based on synthetic rubber. Load-distributing rubberized textile layers 2 were placed above the liner 1. A spiral cone 3 with a length of 135 mm and with a wall thickness increasing gradually from the direction of the hose-body up to 4 mm is built in under the cables at the location of the to-be splicing. The upper (third and fourth) reinforcing cable plies 28A, 28B were bound at a distance of 20 mm from the inner end of the spiral cone 3 and the excess was cut. The hoses were vulcanized on hose mandrel. The conical rigid outer sleeve 4, made of steel, with an inner diameter flaring in an angle of 1° to the central point and with inner surface circularly corrugated was pulled onto hose A. The splicing was made without hose mandrel after folding back the first and second reinforcing plies 11 and 12. The inner sleeves 26A, 26B were bound with right/left-hand threaded socket 27. Liner-ends 1A, 1B, 1 were spliced with uncured rubber compound 5, and load-distributing rubberized textiles 2A, 2B by unvulcanized rubberized load-distributing textile 8, then this section was vulcanized by electrical heating. The first cable 11A of hose A was folded on the spliced vulcanized load-distributing rubberized textile 2 and was fixed there by binding, then the cable 11B of hose B was laid on it. Cables 11A and 11B of the two hoses overlapped each other at a length of 160 mm after lying. The second cables 12A and 12B of hoses A and B were folded back with an overlapping of 135 mm. The conical rigid outer sleeve 4 was moved to its final place and fixed at its ends with filling rubber 9. The space between cables was filled as filling/adhesive material with resin (epoxy resin) 7, rubberized textile 10 reinforcing the cover and cover rubber 13 were also applied after inserting the resin inlet closing screw 6. While vulcanizing the cover rubber 13 the epoxy resin crosslinked to its final network density. The complete spliced hose was exposed to a pressure test of 700 bar, then tension test was performed without inner pressure. During the test the inner flexible stripwound collapsed at a force of 880 kN, but the splicing remained undamaged.

EXAMPLE 3

Figure 4:
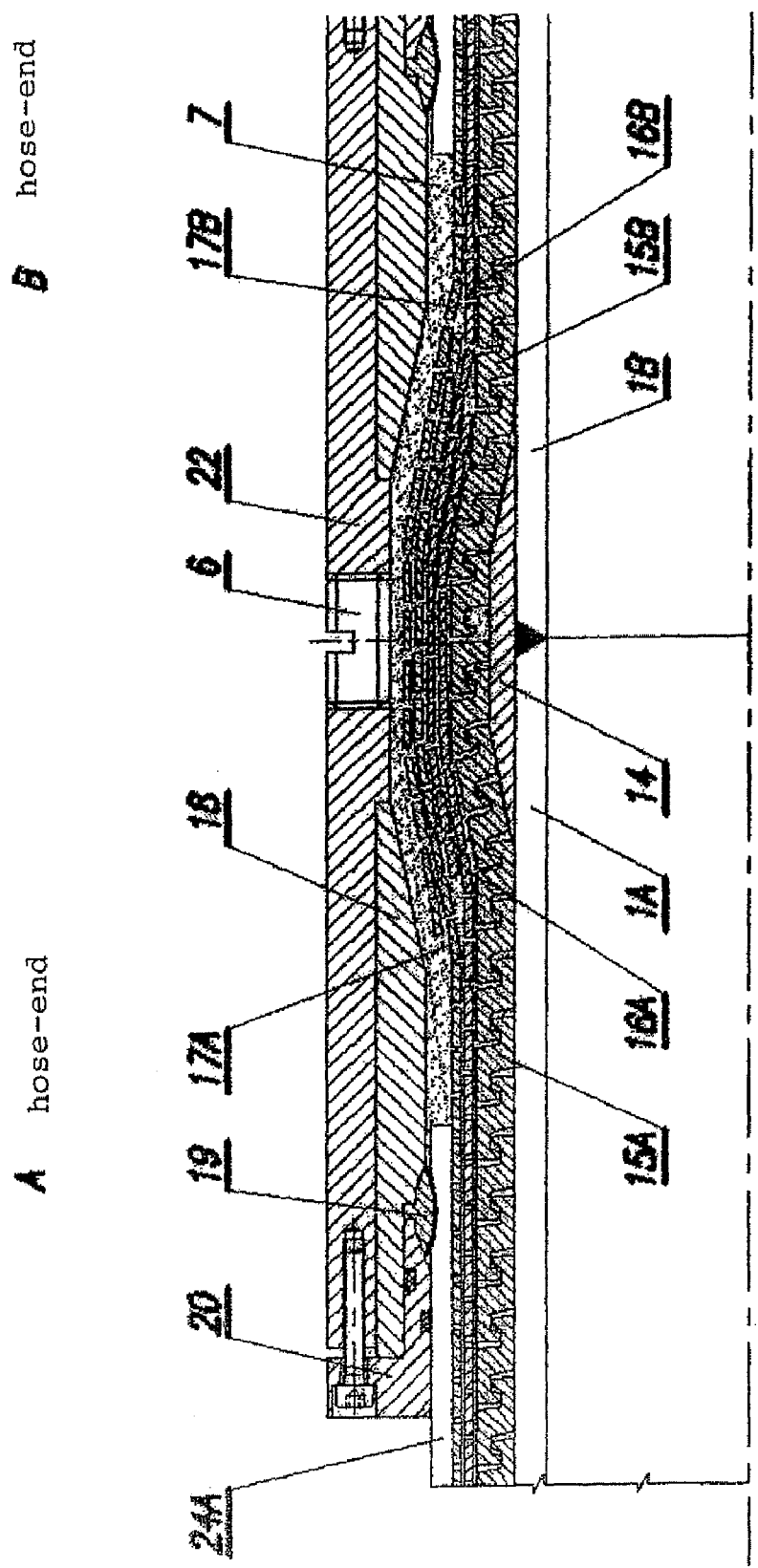
FIG. 4 is a sectional view of an unbonded hose containing also an inner flexible stripwound.

By means of FIG. 4 splicing of unbonded hoses with plastic liner and reinforced with steel profile 15, lower (first) flat steel ply 16, and upper (second) flat steel ply will be described. Distinction is made between hose A and hose B to be spliced. Plastic covers 24 of the hoses are cut back in a length as necessary. Fixing element 18, gullet-tooth fixing element, fixing element 20, and O-rings 21 protecting against outer moisture penetration are pulled onto the two hose-ends. Outer sleeve 22 is pulled onto one of the hoses. Flat steel plies 16, 17 are folded back. Steel profiles 15A, 15B and liners 1A, 1B are cut back on either hose by half of the intended overlapping of the flat steel plies 16, 17. The steel profile 15 is loosed and an inner sleeve 14 is pulled onto one of the hoses. The liner-ends 1A, 1B are welded. The inner sleeve 14 is pulled onto the welded liner, then steel profiles 15A, 15B are laid back from either side. The upper flat steel ply 16A of hose A, then the other flat steel plies 16B, 17A, 17B are laid back successively with overlapping. Outer sleeve 22, and fixing elements 18, 19, 20 are pulled to place. Gullet-tooth fixing element 19 is pressed onto plastic cover 24 by drawing screws 23.

REFERENCE NUMBERS 1 liner
2 load-distributing rubberized textile
3 spiral cone
4 rigid conical outer sleeve
5 liner splicing
6 resin inlet closing screw
7 resin
8 load-distributing textile abutting
9 filling rubber
10 rubberized textile
11 lower (first) cable ply
11A, 11B reinforcing plies of hoses to be spliced
12 second cable ply
12A, 12B reinforcing plies of hoses to be spliced
13 cover rubber
14 inner sleeve
15 steel profile
16 lower (first) flat steel ply
17 upper (second) flat steel ply
18 fixing element
19 gullet-tooth fixing element
20 fixing element
21 Oring sealing
22 outer sleeve
23 screw
24 plastic cover
25 inner flexible stripwound
26 threaded sleeve
27 right/left-hand threaded socket
28 upper (third and fourth) cable plies
28A, 28B reinforcing plies of hoses to be spliced
29 separation strip
30 hose mandrel

The invention claimed is:

1. A long-length hose spliced from two or more hoses comprising an inner sealing layer, at least two spirally laid reinforcing plies, and a cover, wherein a liner forming the inner sealing layer comprising a leak-tight splicing of liners of the hoses to be spliced and the at least two reinforcing plies are embedded into filling/adhesive material inside of a rigid outer sleeve, at the location of the splicing.

2. A long-length hose according to claim 1, wherein at least one of the at least two reinforcing plies of each spliced hose is overlapped within the rigid outer sleeve.

3. A long-length hose according to claim 1, wherein the at least two reinforcing plies comprise two reinforcing plies, the reinforcing ply laid in higher angle is overlapped.

4. A long-length hose according to claim 1, further comprising a rigid inner sleeve under the liner at the splicing.

5. A long-length hose according to claim 1, wherein at least one of the at least two reinforcing plies on either side of the splicing is supported by an element flaring conically towards the location of the splicing.

6. A long-length hose according to claim 1, wherein the at least two reinforcing plies comprise more than two reinforcing plies, the reinforcing plies laid in the highest angle contain overlapping.

7. A long-length hose according to claim 1, wherein at least one of the at least two reinforcing plies on either side of the splicing is supported by a spiral cone and the rigid outer sleeve is flaring conically from either side to a central point.

8. A long-length hose comprising:
at least two hoses;
at least two spirally laid reinforcing plies;
a liner comprising leak-tight spliced liners of the at least two hoses; and
a rigid outer sleeve;
wherein the liner and the at least two reinforcing plies are embedded into a filling/adhesive material inside of the rigid outer sleeve.

9. A long-length hose according to claim 8, further comprising a cover disposed over the rigid outer sleeve.

* * * * *